May 11, 1948.                H. N. FAIRBANKS                2,441,313
           HEAT SCREEN CONTROL FOR MOTION PICTURE PROJECTORS
                         Filed March 9, 1946
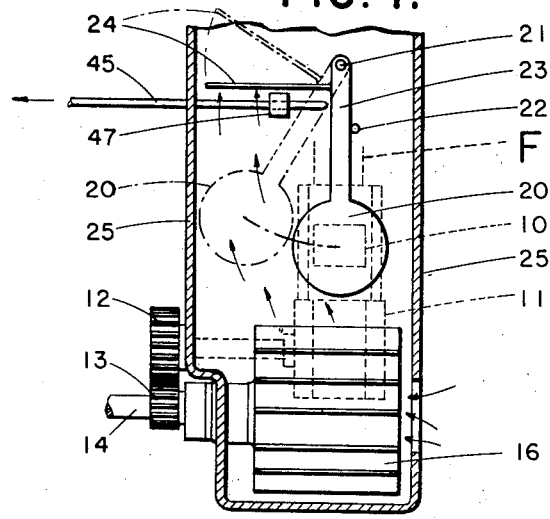
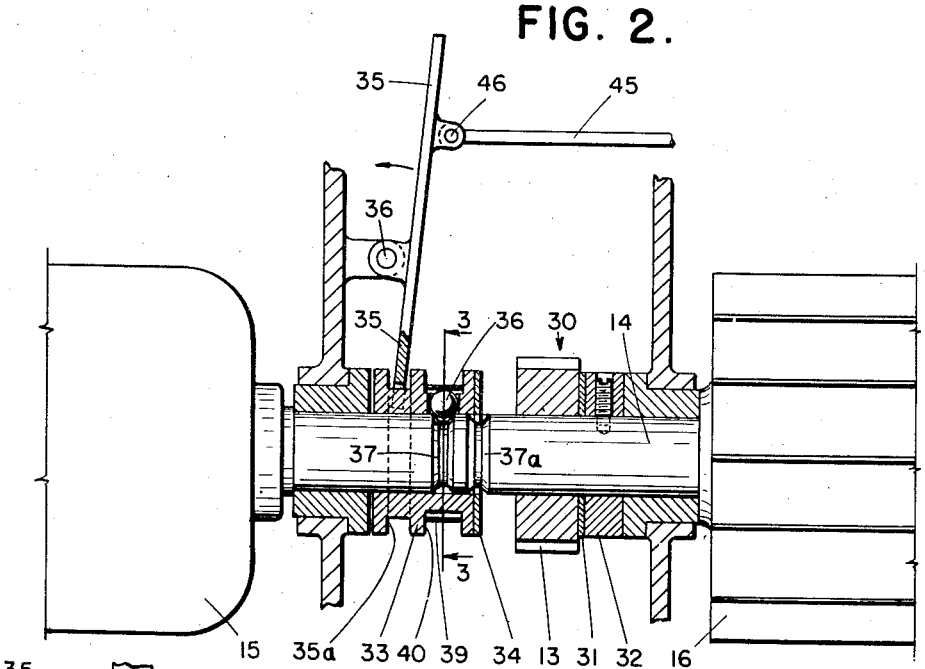
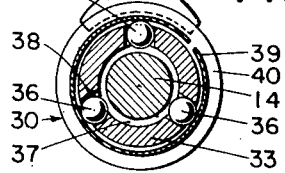
INVENTOR
HENRY N. FAIRBANKS
BY
Bakelew & Kantlebury
ATTORNEYS Patented May 11, 1948

2,441,313

UNITED STATES PATENT OFFICE 2,441,313

HEAT SCREEN CONTROL FOR MOTION-PICTURE PROJECTORS

Henry N. Fairbanks, Beverly Hills, Calif., assignor to Mitchell Camera Corporation, West Hollywood, Calif., a corporation of Delaware Application March 9, 1946, Serial No. 653,409

4 Claims. (Cl. 88—17)

This invention relates to motion picture projectors, and more particularly to a means through which the drive of the film movement is controlled, and the co-relation of that drive control with a heat screen which functions to protect the film during periods when it is stationary. The general objective and purpose of the invention is to provide simple and effective mechanisms for the purposes stated.

Further objectives of the invention, together with its corresponding accomplishments, will be understood from the following detailed description of a preferred and illustrative embodiment, and from the accompanying drawings of that illustrative embodiment; in which drawings Fig. 1 is a diagram illustrating schematically a typical relationship between the movement drive, the air-circulating fan and the film aperture to which the heat screen or shutter is applied;

Fig. 2 is a fragmentary longitudinal section illustrating the clutch mechanism which controls the drive of the film movement; and Fig. 3 is a detailed cross-section taken on line 3—3 of Fig. 2.

In the schematic showing of Fig. 1 the film F is driven past the film exposure aperture 10 by a film movement which is indicated diagrammatically at 11. Movement 11 is illustrated as being driven by gearing 12, 13 from shaft 14 which, in this particular illustrative showing, is the shaft of driving motor 15 (Fig. 2) and directly carries and operates the air circulation fan 16. A pivoted or otherwise shiftable heat screen 20 has a normal position, such as shown in full lines in Fig. 1, where it overlies exposure aperture 10 and either fully or partially blocks off the beam from the source of illumination (not shown). That source of illumination, or what is usually called a lamp house, may be considered in Fig. 1 to lie in a position toward the observer from exposure aperture 10; and heat screen 20 normally lies over aperture 10 between the source of illumination and the aperture and film.

In the particular form of shiftable heat screen shown in the drawings the screen 20 hangs by an arm 23 from a pivot 21, and in its normal aperture covering position it may bring up against a stop, such as is indicated at 22. A vane 24, which is seen edgewise in Fig. 1, projects laterally from arm 23; and the upward fan-impelled circulation of air through the passage which is diagrammatically represented as being enclosed by walls 28, tends to cool the film at aperture 10 and, by action on vane 24, to move screen 20 to the dotted line position away from its normal position in front of the aperture. The screen is so balanced, by the weight of vane 24 or otherwise, that it will not be moved out of its normal film protecting position unless the air current is flowing substantially at the normal operating velocity which corresponds to operating speed of the motor and fan. In the apparatus as so far explained, when the driving motor and fan are operating at operating speed, the air current will move screen 20 from in front of the aperture whether or not the film movement is in operation and whether the film is stationary or in movement. Thus, insofar as the explained parts of the apparatus are concerned, the heat screen can be displaced to expose the film to the heat of the illuminating beam from the lamp house when the film is stationary. It is a general function of those parts of the apparatus now to be explained to prevent the shifting of the heat screen to expose the film except when the film is in movement; freeing the heat screen to be moved by the air current when the film is in movement. The functional result is that the heat screen is not shifted to its film exposing position unless the film is in movement and the cooling air current is flowing effectively at full velocity.

It will be understood that when the heat screen is spoken of as covering or overlying the aperture, it is not necessarily meant that the screen lies in a plane close to the aperture. The screen can be located in any suitable plane between the light source and the film at the aperture; and the vane 24 or other equivalent member or means operable by the air stream may be located in any suitable position to be so operated.

In Fig. 2 the movement driving gear 13 is shown as loosely mounted on motor shaft 14, to be rotatively connected with the shaft through the operation of a clutch mechanism 30. The clutch mechanism here shown has certain advantageous features which lend themselves, in a very simple mechanism, to the heat screen control. As here illustrated movement driving gear 13 is adapted to bear on one face against a friction disk 31 of any suitable material, say of cork. That friction disk 31 is backed up by a collar 32 set on shaft 14. At the other side of driving gear 13 there is a longitudinally movable clutch member 33 which carries or backs up another friction disk 34 on its face adjacent gear 13. Longitudinally movable clutch member 33 is shifted between its two positions by a shifting lever 35 pivoted at 36 and, as here shown, simply engaging in a circumferential groove 35a in member 33. In the open clutch position shown in Fig. 2, a set of spring-pressed balls 36 carried by member 33 are pressed into a circumferential groove 37 in shaft 14. As here shown balls 36 are carried in radial openings 38 in member 33 and are pressed inwardly by a circular spring clip 39 which surrounds the formation of balls and lies in a circumferential groove 40 in member 33. In the position of the parts shown in Fig. 2 clutch member 33 and its friction disk 34 are held away from the face of gear 13 so that the gear, and the film movement 11, are not driven.

By forcibly shifting lever 35 in a direction indicated by the arrow the spring detent balls 36 are forced out of groove 37 and, clutch member 33 moving toward the right in Fig. 2, the balls enter another shaft groove 37a as friction disk 34 is pressed against gear 13 and gear 13 is pressurally confined between that friction disk and the other friction disk 31. Groove 37a is so positioned that when disk 34 is in full pressural contact with gear 13, balls 36 have not quite fully entered inwardly into groove 37a but engage only the left hand side of that groove; so that the inward spring pressure acting on the balls tends to press clutch member 33 toward the right and to maintain the frictional pressure upon the driving gear. Continuing frictional pressure need not be maintained by clutch actuating lever 35; and in both the open and closed positions of the clutch lever 35 may merely loosely engage in clutch groove 35a.

As here shown, and preferred for simplicity, collar 32 is fixed rotatively to shaft 14 but clutch element 33 is not. Either one or both of 32 and 33 may be rotatively fixed to the shaft. And friction disks 31 and 34 may be affixed either to the gear 13, or to 32 and 33, or may float between the gear and elements 32 and 33.

The cooperating interconnection between clutch mechanism 30 and the heat screen 20 may be of various types. It is here shown in the form of an arm 45 which is connected to clutch lever 35 to move with it. Such an interconnecting arm may move either pivotally or slidingly, depending upon the physical relationship of lever 35 and heat screen 20, and the physical relationship of their planes of movement. In the schematic drawings, the planes of movement of lever 35 and heat screen 20 are illustrated as being parallel, and the interconnecting arm 45 is therefore shown as being a simple sliding arm or rod, connected at one end at 46 to lever 35 and at its other end (Fig. 1) shown as sliding through a guide 47 and having its end in stop relationship to an edge of arm 23 of the heat screen. In the illustrated positions of the parts, with clutch 30 open and the film movement not being driven, the end of arm 45 lies close to or against the left hand edge of heat screen arm 23, preventing the heat screen from being moved by the air current to the dotted line position of Fig. 1. Upon closure of the movement driving clutch, the movement of lever 35 and arm 45 toward the left removes the stop restriction on heat screen arm 23 and thus, without positively moving the heat screen to its dotted line position to expose the film or the aperture, allows the heat screen then to be moved to its film exposing position by air circulation set up by fan 16. Thus, if the projector operator should close clutch 30 before starting the driving motor 15 and then, with the source of illumination turned on, start the film in motion by starting the driving motor, the heat screen will not be moved to its film exposing position until the driving motor and fan 16 have substantially reached operating speed; as the heat screen is so weighted by vane 24 or otherwise as to remain in its film protecting position until the air current impelled by fan 16 reaches substantially its operating velocity.

The clutch mechanism in and of itself is not the subject matter of the invention claimed herein. Although here described in preferred specific form, the clutch mechanism is merely illustrative of means for drivingly connecting the film movement to the driving motor, or of means for driving the movement. That driving is preferably, of course, from the same motor that drives the fan.

I claim:

1. In a motion picture projector mechanism, which embodies structure having a film exposure aperture, a film movement, a driving motor and an air circulating fan driven from the motor; the combination of a shiftable heat screen having a normal position overlying the exposure aperture and shiftable to non-overlying position by virtue of flow of the fan impelled air current when the fan is driven at normal speed, a clutch mechanism through which the film movement is driven from the shaft, and a movable screen stop member connected with the clutch mechanism and movable therewith as the clutch mechanism opens and closes, said stop member lying in a position to prevent movement of the heat screen from its normal position when the clutch mechanism is open and moving to a position allowing movement of the heat screen when the clutch mechanism is closed.

2. In a motion picture projector mechanism, which embodies structure having a film exposure aperture, a film movement, a driving motor and an air circulating fan driven from the motor; the combination of a shiftable heat screen having a normal position overlying the exposure aperture and shiftable to non-overlying position by virtue of flow of the fan impelled air current when the fan is driven at normal speed, means through which the film movement is driven from the motor, said means embodying a motor driven shaft, a movement driving gear loosely mounted on the shaft, a longitudinally shiftable clutch element on the shaft adapted in one position to drivingly engage the gear and in another position to disengage the gear, yielding detent means for holding said clutch element in either of its positions, a clutch element shifting lever; and a movable stop member connected with the lever and lying in a position stopping heat screen movement from its normal position when the clutch element is in its gear disengaging position and moving to a position where it allows the heat screen to be moved by fan impelled air flow when the clutch element engages the gear.

3. In a motion picture mechanism which embodies structure having a film aperture, means for circulating a stream of cooling air past the aperture, a film movement, and movement driving means by which the movement may be driven; the combination of a shiftable heat screen having a normal position overlying the exposure aperture and shiftable by virtue of flow of the stream of cooling air to a non-overlying position, and releasable screen holding means operatively connected to the film movement driving means, adapted to prevent movement of the heat screen from its normal position when the film movement is not being driven, and releasable to allow such movement of the heat screen when the film movement is being driven.

4. In a motion picture projector mechanism which embodies structure having a film exposure aperture, a film movement, a driving motor and an air circulating fan driven from the motor and adapted to circulate a stream of cooling air past the aperture; the combination of a shiftable heat screen having a normal position overlying the exposure aperture and shiftable to non-overlying position by virtue of flow of the fan impelled air current, means for drivingly connecting the film movement with the driving motor, and means actuated by said connecting means and acting to prevent the shifting of the heat screen by the air current when said connecting means is inoperative and the movement is not drivingly connected with the motor.

HENRY N. FAIRBANKS.

REFERENCES CITED

The following references are of record in the file of this patent:

UNITED STATES PATENTS

| Number | Name | Date |
|---|---|---|
| 944,749 | Stanley | Dec. 28, 1909 |
| 1,684,304 | Berg | Sept. 11, 1928 |
| 2,100,464 | Almen et al. | Nov. 30, 1937 |
| 2,174,316 | Dunkelow | Sept. 26, 1939 |
| 2,227,269 | May | Dec. 31, 1940 |

FOREIGN PATENTS

| Number | Country | Date |
|---|---|---|
| 396,138 | Germany | May 26, 1924 |
| 473,443 | Germany | Mar. 16, 1929 |